(12) United States Patent
Wang et al.

(10) Patent No.: US 6,278,456 B1
(45) Date of Patent: *Aug. 21, 2001

(54) WEB CALENDAR ARCHITECTURE AND USES THEREOF

(75) Inventors: Shou-Chung Wang, Tenafly; Wenwey Hseush, Montville, both of NJ (US); Anthony Ma, Bethpage, NY (US)

(73) Assignee: Timecruiser Computing Corp., Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/416,086

(22) Filed: Oct. 12, 1999

Related U.S. Application Data (63) Continuation of application No. 08/721,446, filed on Sep. 27, 1996, now Pat. No. 6,018,343.

(51) Int. Cl.[7] .................................................. G06F 7/00
(52) U.S. Cl. ........................ 345/356; 345/357; 345/963
(58) Field of Search ..................................... 345/333, 334, 345/335, 339, 346, 357, 963, 356; 705/1, 9, 8, 513

(56) References Cited

U.S. PATENT DOCUMENTS

| | | |
|---|---|---|
| 5,307,086 | 4/1994 | Griffin et al. . |
| 5,323,314 | 6/1994 | Baber et al. . |
| 5,428,736 | 6/1995 | Kahl et al. . |
| 5,530,852 * | 6/1996 | Mesice ................................. 345/333 |
| 5,572,643 | 11/1996 | Judson . |
| 5,592,602 * | 1/1997 | Edmunds et al. ..................... 345/344 |
| 5,706,502 | 1/1998 | Foley et al. . |
| 5,790,790 | 8/1998 | Smith et al. . |
| 5,802,530 | 9/1998 | Van Hoff . |
| 5,812,529 | 9/1998 | Czarnik et al. . |
| 5,867,822 * | 2/1999 | Sankar ..................................... 705/8 |
| 6,064,977 * | 5/2000 | Haverstock .............................. 705/9 |

FOREIGN PATENT DOCUMENTS

WO98 13753  4/1998  (WO) .

* cited by examiner

*Primary Examiner*—Raymond J. Bayerl
*Assistant Examiner*—Cao H. Nguyen
(74) *Attorney, Agent, or Firm*—Cooper & Dunham (57) ABSTRACT

An architecture for facilitating Web-based client-side calendar event scheduling includes a Web Calendar scheduling tool which takes input via either a mouse and/or a keyboard to achieve a) an Internet personal organizer, b) multimedia effects associated with scheduled events, c) an Internet groupware that shares group members' individual schedules, d) an Internet transaction associated with scheduled events, and e) an open platform that supports any Java applet. Users of the Web Calendar can schedule events, associate a special purpose Capplet™ with scheduled events, and store them for future reference or public use. It features concurrent Capplet™ views running under one of four calendar grids: yearly, monthly, weekly, and daily. The architecture also supports multimedia animation in pop-up windows whose dimensions are defined dynamically by an invocation method. It is an open platform on which any user can create a special purpose applet and run it on the Web Calendar.

13 Claims, 4 Drawing Sheets

WEB CALENDAR ARCHITECTURE AND USES THEREOF

This application is a continuation of U.S. Ser. No. 08/721,446 filed Sep. 27, 1996, now U.S. Pat. No. 6,018,343, issued Jan. 25, 2000.

FIELD OF THE INVENTION

The present invention relates to a Web-based calendaring tool for scheduling appointments and daily events. More particularly, the present invention relates to a Web-based calendar having links to calendar applets for coordinating the schedules of a group of users.

BACKGROUND OF THE INVENTION

The Internet and World Wide Web

Internet

The Internet is the name for a group of worldwide information resources. The roots of the Internet lie in a collection of computer networks that were developed in the 1970s. They started with a network called the Arpanet that was sponsored by the United States Department of Defense. The original Arpanet has long since been expanded and replaced, and today its descendent forms the global backbone of what we call the Internet.

It would be a mistake however to think of the Internet as merely a computer network, or even a group of computer networks connected to one another. Computer networks are simply the media that carries a huge resource of practical and enjoyable information. The Internet allows millions of people all over the world to communicate and to share with one another. It is a people-oriented society.

The Internet has a slew of services, including: Text file, Telnet session, Gopher, Usenet news group, File Transfer Protocol and the World Wide Web. Each have either specialized information contents or specialized network functions.

World Wide Web (WWW)

The Web, one of Internet's many resources, was originally developed in Switzerland at the CERN research center. The idea stemmed from a need for the CERN physicists to share their work and to use community information. This idea was later embraced as a general means for accessing information and services.

Like many other Internet resources, the Web uses a client/server system. Users use a client program called a browser, which serves as a window into the Web. From the point of view of the Web, everything in the universe consists of either documents or links. Thus the job of a browser is to read documents and to follow whatever links users select. A browser knows how to access just about every service and resource on the Internet, such as how to connect to WWW servers that offer public hypertext documents.

In the language of the Web, a hypertext document is something that contains data and, possibly, links to other documents. What makes the Web so powerful is that a link might connect to any type of Internet resource. It is flexible and convenient to use.

The Internet Protocols

The protocols that hosts use to communicate amongst themselves are key components of the Internet. For the WWW, HTTP is the most important of these communication protocols. For a document on the WWW, a reference to the document is called a URL. The URL contains the name of the protocol, HTTP, that is used to find that document. Current Web browsers have HTTP built-in.

Java

Java is a language developed by Sun for application development within a number of heterogeneous network-wide distributed environments. The paramount feature of Java is the secure delivery of applications which consumes the minimum amount of system resources, that can run on any hardware and software platform, and that can be dynamically extended.

Java may be characterized by three goals: to live, to survive, and to flourish.

The massive growth of the Internet and the World-Wide Web has led to a completely new way of looking at development and distribution of software. To live in the world of electronic commerce and distribution, the Java language supports secure, high-performance, and highly-robust application development on multiple platforms in heterogeneous distributed networks.

Operating on multiple platforms in heterogeneous networks invalidates the traditional schemes of binary distribution, release, upgrade, patch, and so on. To survive in this jungle, the Java language is architecturally neutral, portable, and dynamically adaptable.

To ensure the programmers can flourish within their software development environment, the Java language system is simple, so that it may be easily programmed by most developers, familiar, so that current developers can easily learn the Java language, object oriented, to fit into distributed client-server applications, multithreaded, for high performance of applications that require multiple concurrent activities, and interpreted, for maximum portability and dynamic capabilities.

Java vs. Procedural Languages

At a fundamental level, procedural languages are designed first to provide programmers with a framework for issuing commands for a computer to execute (hence the term "procedural"), and second to allow programmers to organize and manipulate data. Procedural languages vary in how they intuitively handle the two features. For example, COBOL, FORTRAN, and C are all procedural languages, and each has a specialized area that cannot be interchanged.

An object-oriented language like Java is designed first to allow programmers to define the objects that make up the program and data contained therein, and second to define the code that makes up the program.

Many programmers use C++ or languages like Object Pascal, Perl 5.0, and Objective C. What these languages have in common is that they are hybrid languages, or procedural languages with object-oriented extensions. These languages make it possible for programmers to use objects within their programs. They allow, and in many cases require, the use of procedural code to accomplish certain tasks.

Java vs. Other Object-Oriented Languages

A pure object-oriented language has all data in the language represented in the form of objects. In SmallTalk, which is a pure object-oriented language, every aspect of the language is object- or message-based and all data types, simple or complex, are object classes.

Java implements the basic C simple data types, such as integer, characters, and floating point numbers, outside the object system, but deals with everything else as objects. Such a language design enables Java to avoid many of the performance pitfalls found in a purely object-oriented language. In all other ways, Java is a pure object-oriented language. All program code and data reside within objects and classes.

Applet

An applet is a small Java program that is automatically downloaded from a Web site and runs within a user's Web browser in response to instructions to do so contained within the Web page being viewed by the user.

Java-Capable Browser

There are three different types of Web browsers: ordinary Web browser, Java-capable Web browser, and native Java Web browser.

An ordinary Web browser is not capable of handling applets.

A Java-capable browser, such as Netscape, is a browser that supports Java applets. This kind of browser provides a display area for one or more applets in the browser window. The display area displays a Web page in the same way that the browser displays images. An applet can use a display area however it sees fit, such as using the area to display buttons and other user interface controls or to display graphics and animation.

HotJava is a native Java Web browser and was written in Java. Applets running in HotJava can have much more control over the browser's user interface environment than in the other types of browsers, and the browser can be extended to support new media formats and protocols through the use of Java code. There are definite boundaries between the C code in which the Netscape browser was written and the Java code of the applets that the browser runs.

Java and Other Platforms

Although Sun intends to directly support only a select group of platforms, it has taken steps to ensure that Java will eventually be ported to every platform where there is interest in doing so. Sun has made the source code to JDK freely available for non-commercial use. This has triggered a number of efforts to port Java to different platforms including Linux, Next, and Amiga, in addition to Windows 95, Windows NT, and Sun's Solaris. These efforts are necessary to make Java applets transparent to all operating environments connected to the Internet.

SparcWork Calendar Tool

SparcWork Calendar Tool is a calendar schedule keeper developed by Sun. It serves as a personal organizer capable of scheduling and reminding users of their appointments. It also serves as groupware capable of sharing schedule information amongst colleagues within work groups.

The Calendar Tool is, however, strictly text based with no multimedia effect capability, and it cannot connect to the Internet directly. Like most other schedulers/organizers, it functions only within Sun's proprietary operating system.

SUMMARY

The idea for the present invention began as a Java visual table widget (vTable) with Internet capability on a Web browser, for use by programmers who needed a table widget written in Java to organize their data presentation. vTable is a programmable layout manager that supports data presentation in two dimensional grids, rows, columns, and cells. vTable adopts model-view GUI paradigm such that, for each view object, there is a model object controlling its contents. There can be multiple views associated with a single model. Once the model's contents changes, all of the related views are automatically refreshed with the new contents.

The idea was then developed into an Internet application in which the visual table would have enhanced interfaces and features. The application of a Web-based calendar is a natural extension of the visual table because every calendar view uses a two-dimensional table. A jigsaw puzzle application was also considered, but was ruled out for its lack of a practical usage.

The Web Calendar is a Web-based personal organizer that enables scheduling of daily events and appointments. To make the Web Calendar stand, a multimedia animation calendar applet architecture was provided. This feature allows client-side event specification and Capplet™ event association. Furthermore, it can be separately used by a group of individual users as groupware to facilitate the sharing and coordination of group member schedules.

The calendar applets are supported by an enhanced Java GUI foundation library. This includes specialized layout managers, panels, list controls, and miscellaneous components. A layout manager organizes the geographical location of its components. A panel is a container that is contained within a container. All of these enhancements are necessary for the Web Calendar GUI and are not provided by the Java language Abstract Windowing Toolkit.

The scope of the invention covers: 1) an Internet personal organizer, 2) an Internet groupware, 3) a calendar event with multimedia effects, 4) an open calendar architecture for running any Java applet, 5) an invocation method for programs with display panels, and 6) an Internet transaction done directly through calendar events.

TERMINOLOGY DEFINITIONS

Web Calendar: a calendar system that runs in an Internet server/browser environment.

Calendar base: the key calendar component that manages scheduled events and controls the execution of actions associated with an event.

Capplet™: a specialized Java program that runs within a Web Calendar to provide multimedia effects or event-related transactions for scheduled events. Examples include: a Capplet™ that sings the happy birthday song while graphically displaying animated cake candles and balloons; a Capplet™ that shows today's weather in a multimedia graphical display; a Capplet™ that sends e-mail to selected users; and a Capplet™ that schedules future events on behalf of the user.

Calendar view: a view that displays calendar events and their related information with a series of time slots. A calendar may have four types of views: monthly, weekly, daily, and yearly. Each view has a time scope. For example, a monthly view with a scope of July, 1996 shows events for July 1996. A weekly view has a scope of seven days. A daily view shows events in 24-hour slots.

Panel: a graphical display area within a view.

Event: an entity associated with a time. An event has at least three components: (1) starting time, (2) ending time, and (3) description. Examples include: appointment with dentist at 7:00 pm, Jul. 2, 1996; John's birthday on Jul. 4, 1996; Java conference from Jun. 3, 1996 to Jun. 7, 1996; dinner appointment at 7:00 pm, Jun. 1, 1996; and project deadline on Jul. 10, 1996.

HTML (Hypertext Markup Language): language in which Web documents are written. HTML has the following features:

Document formatting: ability to include hyperlinks which point to other Web documents or services on computer systems all over the Internet; and ability to embed graphical images and clickable image maps with hot spots to take users to various places depending on where in the image users clicked. We say that an event occurs if the current time is between the starting time and the ending time of the event. We say that an event appears in a view if either the starting time or the ending time of the event falls within the scope of the view.

Multithreading: ability to run multiple threads concurrently. Each thread can be thought of as a separate mini-program that gets started by an application and runs in parallel to it. Java programs often use several threads handling various activities, such as tracking the mouse position, updating the position of on-screen graphical objects, or simply keeping time.

Object Oriented: used to describe languages, styles of programming, user interfaces, etc. Conceptually, object programming is often described in terms of real-world objects (cars, people, houses, computers, etc.) by using software objects to simulate them in an object-oriented language.

Protocol: messaging mechanism that is understood by both ends of a communication line.

Concurrency: multiple processes or threads running within the same time slot in a time-sharing manner. Each process or thread thinks it has the whole CPU to itself.

GUI (Graphical User Interface): general term for all window-based front-end widgets. All GUI's use graphics on a bitmapped video display. Graphics provide better utilization of screen real estate, a virtually rich environment for conveying information, and the possibility of WYSWYG (what you see is what you get) video display of graphics and formatted text prepared for a printed document.

Model-View Paradigm: method for GUI programming in which all displayed data contents are controlled by an independent model object. There is no limit to the number of views associated with a model. The model can detect a data content change and respond by triggering refresh actions for all related views. The ability to detect and respond may be controlled by a third object called Controller. The purpose behind a model-view paradigm is to de-couple display functions from application functions, to thereby provide a clean and easy to maintain programming practice.

Enabled: selected. We say that a view is enabled if the calendar user chooses it through user interface.

DETAILED DESCRIPTION OF PREFERRED EMBODIMENTS

Figure 1:
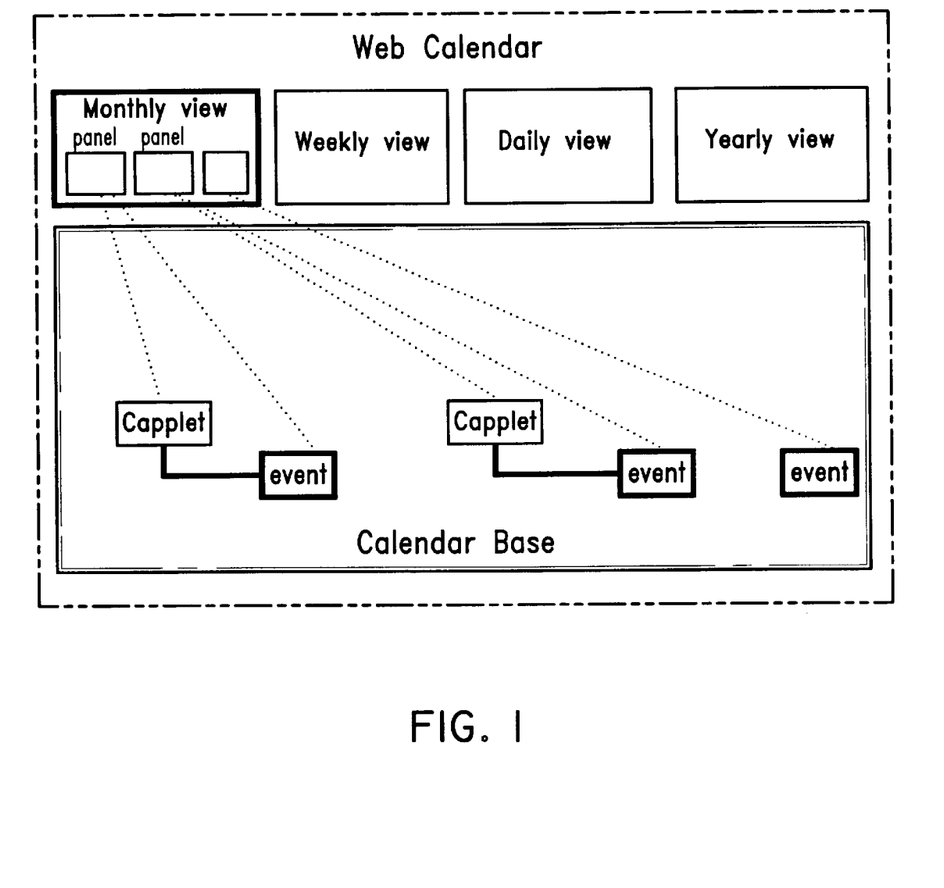
FIG. 1 illustrates a Web Calendar architecture according to an embodiment of the present invention.

This invention provides a base Capplet™ architecture which allows multiple Java programs to run simultaneously in a Web Calendar. As illustrated in FIG. 1, a Web Calendar includes a calendar base and all the calendar views that are built upon the base. The calendar base supports Capplet™, which is an event association and execution process of a Java applet within the calendar environment.

Within the Java-implemented calendar base architecture of the Web Calendar, a Java applet can be associated with any calendar event. Each calendar event, in addition to the applet association, can trigger multiple actions such as e-mail, a pop-up alert, and beeping. Applets can be triggered simultaneously in the weekly and monthly views, either in the cells or in pop-ups.

Figure 3:
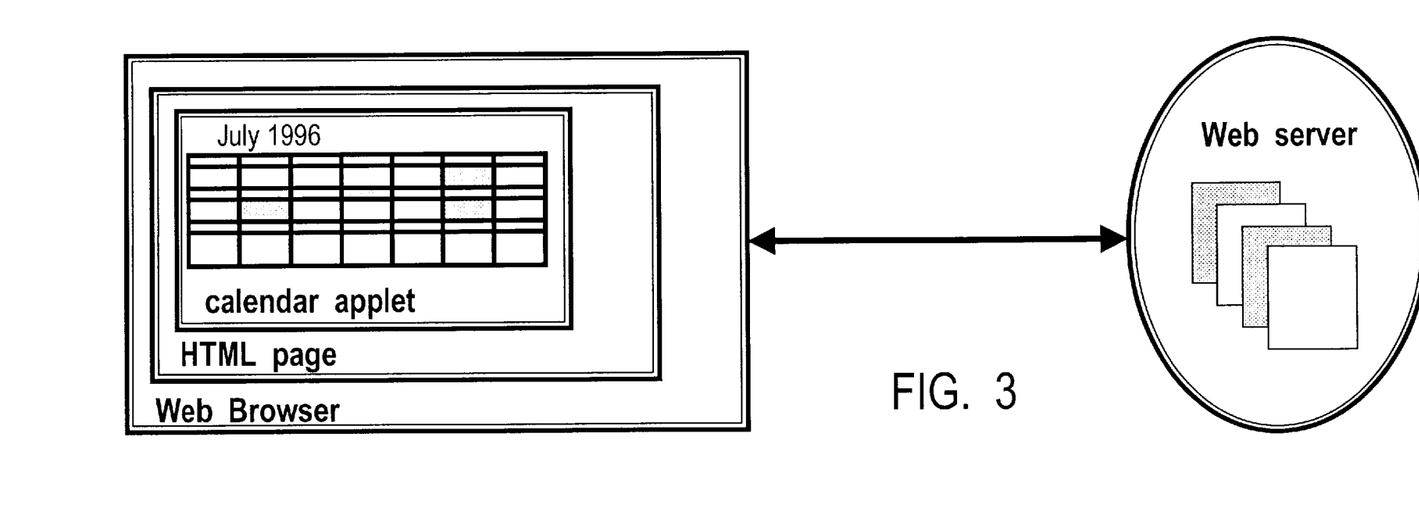
FIG. 3 illustrates a Web Calendar implemented as an applet in Java according to an embodiment of the present invention.

The Web Calendar shown in FIG. 1 with the basic Capplet™ architecture can either be implemented as a Java applet or as an HTML document that runs within a Web browser. As illustrated in FIG. 3, a Web Calendar implemented as a Java applet can be included in an HTML document and can be retrieved from any Java enabled Web browser. In contrast to a Web Calendar implemented in HTML, the applet calendar provides flexibility and capability where the HTML approach is lacking. A server provides schedule data storage and group hierarchy information that feeds the client calendar interactively via the applets. Described herein is an implementation of a Java calendar platform applet, which emphasizes client-side capabilities and flexibility.

A calendar platform applet, running either on the Internet or on any Intranet environment, organizes and manages event schedules for individuals or working groups. This platform is responsible of keeping and showing private and/or public event schedules. Event information is displayed in one of four calendar views (monthly, weekly, daily, and yearly), and maintained in a Web server database.

Figure 2:
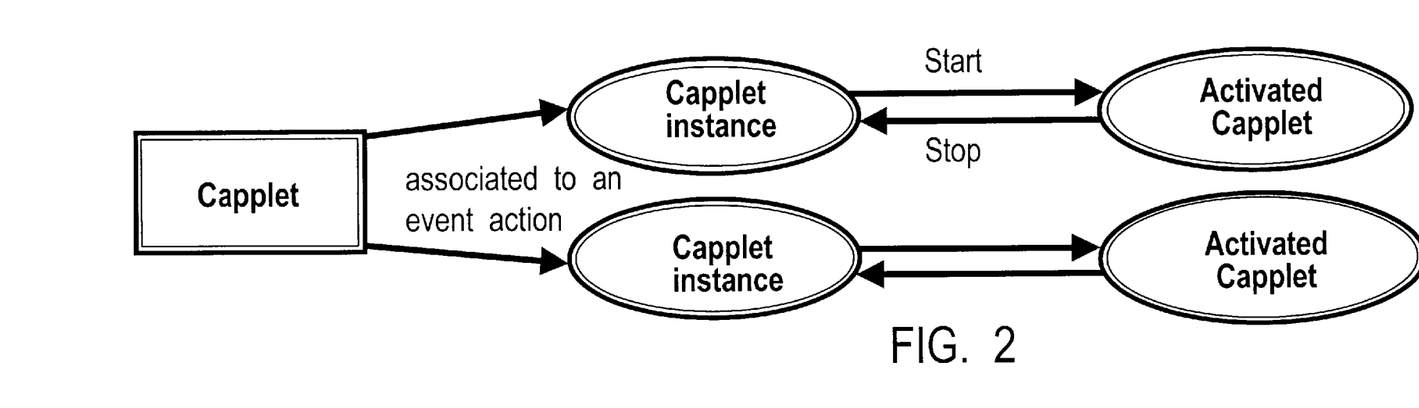
FIG. 2 illustrates various stages of Capplet™ according to an embodiment of the present invention.

A Java program that can run within a Web calendar is called a Capplet™. Once a Capplet™ is associated with an event, it is ready to run. The pair of Capplet™ and event is referred to as a Capplet™ instance. FIG. 2 illustrates the various stages of a Capplet™, including an independent Capplet™ with specialty, an event-associated Capplet™ called a Capplet™ instance, and an invoked Capplet™ instance within a Web Calendar environment. Multiple Capplet™ instances may be created with the same Capplet™.

A Capplet™ in a Capplet™ instance may be activated in one of the following five ways:

When the event occurs.

When a user triggers it.

When a view in which the event appears is enabled.

When a second Capplet™ activates it.

When the Capplet™ is associated with an event (i.e., when the Capplet™ instance is created).

An activated Capplet™ can access the information related to its associated event, such as retrieving the event description or inserting a new event into the user's schedule. Multiple Capplets™ can be activated and run simultaneously in a multithreaded fashion. A panel in an enabled view may be assigned to a running Capplet™. A Capplet™ can also be a background process without a view.

Association Process

Figure 4:
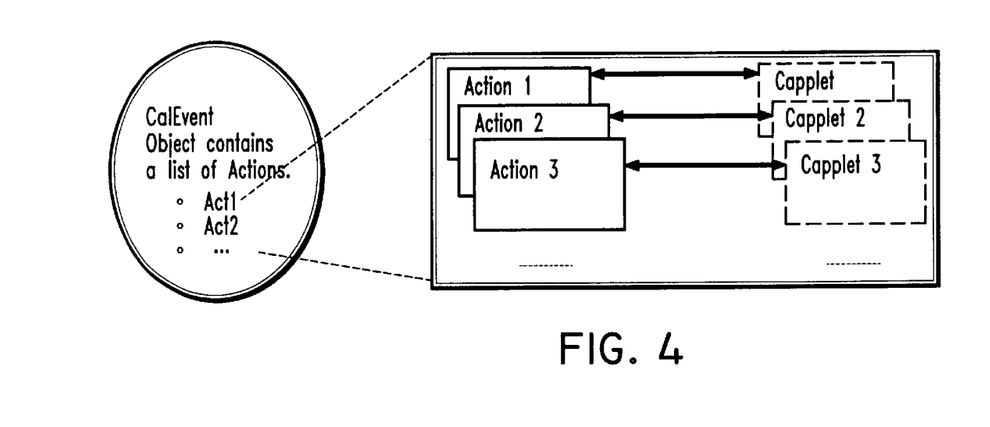
FIG. 4 illustrates a calendar event containing a list of actions according to an embodiment of the present invention.

A user interface within the Capplet™ architecture facilitates Capplet™ and event association. The result is called a Capplet™ instance. There can be as many Capplet™ instances as the user desires per Capplet™. Each Capplet™ instance carries an event id to maintain its uniqueness within the calendar system. A Capplet™ instance is persistent, so a user does not have to re-associate the instance, even after it has been activated. FIG. 4 illustrates a calendar event containing a list of actions such as mail alert, beep alert, or pop-up alert. In general, actions describe what the user wants the Web Calendar to do when the time of the scheduled event arrives. Every event action can be associated with a specialty Capplet™ and have the Web Calendar trigger them automatically.

Within each event, there can be as many actions as the user desires. Each action, carrying an unique action id, can be associated with a Capplet™, as shown in FIG. 4. In order to provide multimedia animation and interaction to an otherwise mundane calendar platform, a basic Capplet™ architecture was incorporated into the calendar platform applet. We provided the following five design components:

1. a common Capplet™ interface.
2. a process for associating a Capplet™ with an event.
3. a Capplet™ execution environment.
4. Capplet™ triggering mechanisms.
5. a Capplet™ plug-in procedure.

Execution Environment

In order to run multiple Capplets™ simultaneously, the calendar applet prepares one environment for each Capplet™ and performs the following:

1. creates a new thread.
2. executes the init ( ) method with the thread.
3. checks whether the Capplet™ has a panel by calling getConfigPanel( ). If yes, the panel is added to the view.
4. executes the start method with the thread.
5. to exit, executes the stop( ) method.

API

```
/*
 * Create a schedule item for a certain date.
 * @ date—the date when the event is scheduled
 * @ detail—the detail of the event
 */
public final class CalEvent extends eRow {
public CalEvent(String owner, Date date, String detail)
    throws IllegalAccessException
    {
    }
//
// Modify the privacy setting of this event.
// The possible values are "U"ser, "G"roup
// and "W"orld. Only the owner of the event
// can change the privacy value of the event.
// Otherwise, an exception will be thrown.
//
public setPrivacy(String value) throws
IllegalAccessException {
}
//
// Check to see if a particular user is the
//owner of this event.
//
public isOwner(String user) {
}
public set(String, key, Object value) {
}
public Object get(String key) {
}
//
// To determine if a date/time falls within
// this event's time period. This facilitates
// the use of multiple days event.
//
public boolean inside(WMDate date) {
}
}
//
// A container class which holds and manages a list
// of action objects associated with a specific
// calendar event-schedule. Each action object in
// the list is associated with an action type.
//
public final class ActionList extends HashTable {public
    Action get(String actionType) {
}
public Object put(Object key, Object value) {
}
}
//
// The Action class is a container class which
// holds information and means to execute
// Capplet™ or Agent.
//
public final class Action extends Object {
// Create an Action object of a certain
// action type.
public Action(String actionType) {
}
// Get the type of this action.
public final String getActionType( ) {
}
// The event that is associated with this
// action.
public final CalEvent getEvent( ) {
}
// Is this an alert type of action?
public boolean isAlert( ) {
}
// Set the time in seconds when this action
// should take place before the actual start
// time. The default value is 0. Only an
// action of ALERT type would be useful in
// this case.
public final void setAlertBefore(long seconds) {
}
// Set the DOMAIN in which this action should
// take place. Capplets™ that are designed to
// run on CLIENT domain may not be suitable for
//SERVER domain.
public final void set-Location(int location) {
}
public boolean isClientDomain( ) {
}
public boolean isServerDomain( ) {
}
public void init( ) {
}
```

```
public void Start( ) {
}
public void stop( ) {
}
public Capplet™ getCapplet™( ) {
}
}
```

The present invention provides a process to run any Java applet on the Web Calendar. A feature of the Web Calendar is the open-ended characteristic of its overall calendar architecture.

Figure 5:
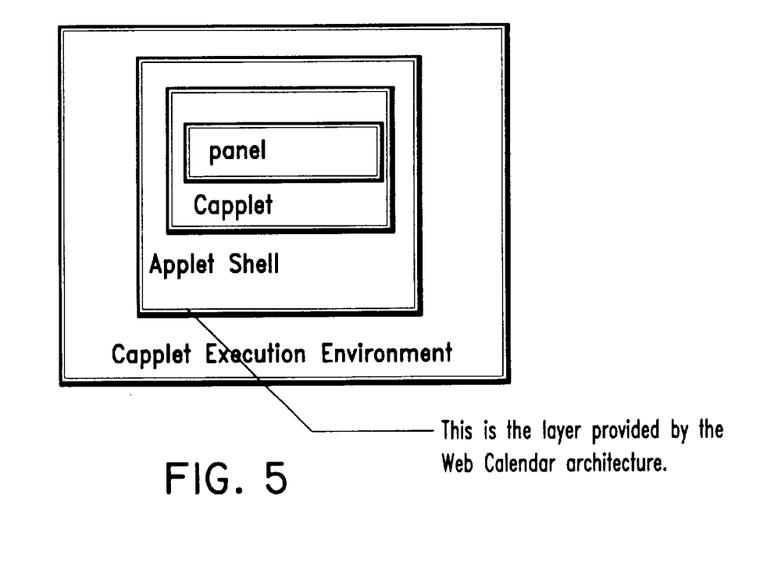
FIG. 5 illustrates an embodiment of the present invention for running an applet within the Web Calendar.

Applets associated with Web Calendar events and run within the calendar context need not conform to any proprietary application programming interface (API) requirements. Just following the standard Java applet API is enough to be able to associate with a calendar event and run within the Web Calendar. Java applets have their own common interface, which is defined in an abstract class called Applet. In order to run an applet within a Web Calendar, the calendar platform applet must provide an applet context for each applet. According to an embodiment of the present invention, an applet shell serves as an applet context, as shown in FIG. 5.

For each applet to run, there are certain functions that the applet must call to prepare itself before running and to coordinate computer resources with other processes while running. The applet shell integrated with the Web Calendar provides these functions so that any applet can run within the Web Calendar views and need not run in its own applet viewer independently.

API:
```
class CappletShell extends Panel implements Capplet™
{
   Applet applet=null;
   Capplet™Shell (Applet applet) {
      super( );
      this.applet=applet;
      setLayout(new BorderLayout( ));
      add("Center", this.applet);
   }
   public void setStub(AppletStub stub) {
      applet.setStub(stub);
   }
   public void initCapplet™(CalEvent event, Hashtable param) {
      applet.init( );
   }
   public void start( ) {
      applet.start( );
   }
   public void stop( ) {
      applet.stop( );
   }
}
```
Common Interface Like Java applet™, every Capplet™ must conform to a common interface. A Java interface is defined as follows:
```
public interface Capplet {
   public void initCapplet™(CalEvent event, Hashtable parameters);
   public void start( );
   public void stop( );
}
public interface ConfigurableCapplet™ extends Capplet™ {
   public java.awt.Panel getConfigPanel(java.awt.Frame parentFrame);
   public java.util.Hashtable getConfigParameters( );
```
The object with a Configurable Capplet™ interface provides a panel and the system will then prepare an applet context for it.

According to another embodiment of the present invention, a process of user interaction to activate a program and run it in a panel whose dimension and location on the screen is dynamically specified is provided. The process includes three steps of user interaction:

1. selecting a window/panel based program by focusing on an icon and pressing a mouse button;
2. moving the mouse to coordinate (x1, y1) and pressing the mouse button; and
3. dragging the mouse to coordinate (x2, y2) and releasing the mouse button.

According to another embodiment, the program is run within a display panel. According to yet another embodiment, the display panel is a window-based program.

A process for invoking an applet and letting the user specify dimensions and a location on a display screen includes three steps of user interaction:

1. selecting a Java program by focusing on an icon and pressing a mouse button;
2. moving the mouse to coordinate (x1, y1) and pressing the mouse button; and
3. dragging the mouse to coordinate (x2, y2) and releasing the mouse button.

Figure 6:
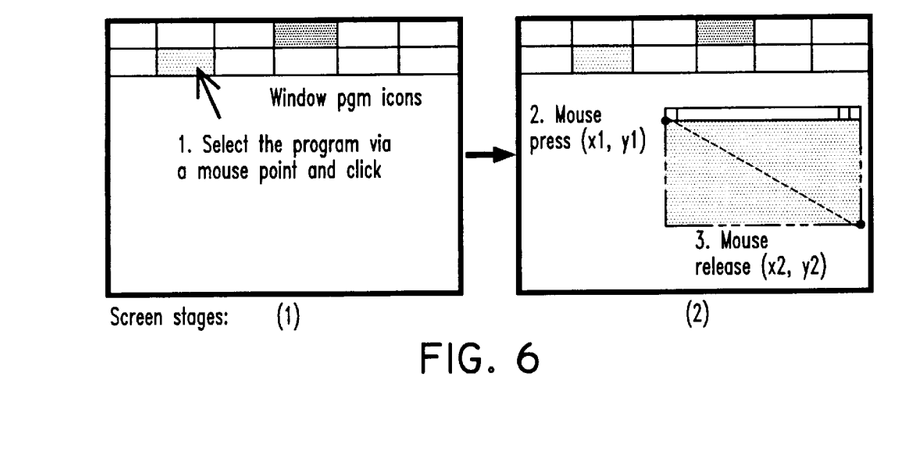
FIG. 6 illustrates a method for specifying a panel dimension according to an embodiment of the present invention.

This is a specific user interaction sequence to invoke a Capplet™ or any Java applet, as shown in FIG. 6. To define the dimension and location for a previously selected Java program, the user chooses an upper left anchor corner of the applet viewer (x1, y1) by pressing a mouse button, dragging the mouse to the lower right corner (x2, y2), and releasing the mouse button.

Upon the user's release of the mouse button, a graphical panel with upper left corner of (x1, y1) and lower right corner of (x2, y2) is created and simultaneously the Java program is started within the newly created panel. The Java program can be an applet, a Capplet™ or simply a Java application.

According to an embodiment of the present invention, a process to produce multimedia effects on a Web Calendar is provided for achieving multimedia effects for calendar events using the Java language to implement the Web Calendar.

Different from the conventional text-based calendar event notification, the Web Calendar combines multimedia and animation to express an event in animated graphics with video and with audio effects. This enables new dimensions for delivering messages for future reference in the calendar event context.

The multimedia effect process facilitates the running of Java™ applets in a Web calendar. A Java applet, by definition, is run under a Java-enabled Web browser context (referred to as an applet context) and can be programmed to produce multimedia effects. According to the present invention, Java is used to implement a Web Calendar that, in turn, provides the Java-enabled Web browser context for multimedia applets.

The process provides a full applet context, in which multimedia capability is included, in a calendar environment, as shown in FIGS. 1, 3, 5, and 7. This is accomplished by proliferating an applet running context for each cell within the calendar. Each cell on a common calendar yearly, monthly, weekly, or daily grid is capable of running its own Capplet™ instance with multimedia effects, in parallel to another cell's Capplet™ instance within the same viewer or browser.

The present invention provides a process with transactional capability with respect to scheduled events within a Web Calendar. The process enables transactions to take place over the Internet via a Web Calendar event.

For example, a Web surfer surfing a Web Calendar can check Box Office event schedules to see if there are any interesting performances that he would like to book a seat for. All the surfer needs to do is to bring the mouse pointer to the event text and click on the mouse button. This triggers a registration Capplet™ associated with that performance. By filling out the primary and secondary preferences of the registration Capplet™ and hitting GO, the surfer instructs the Capplet™ to send the information to the server for transaction processing. The surfer will then receive a rejection or a confirmation with a reference number.

As evident from the above discussion, a Web Calendar has two "sides" of users: the calendar events publisher (such as museums, corporations, sports teams, college registrars, etc.), and the Web surfers (such as consumers, students, etc.).

Figure 7:
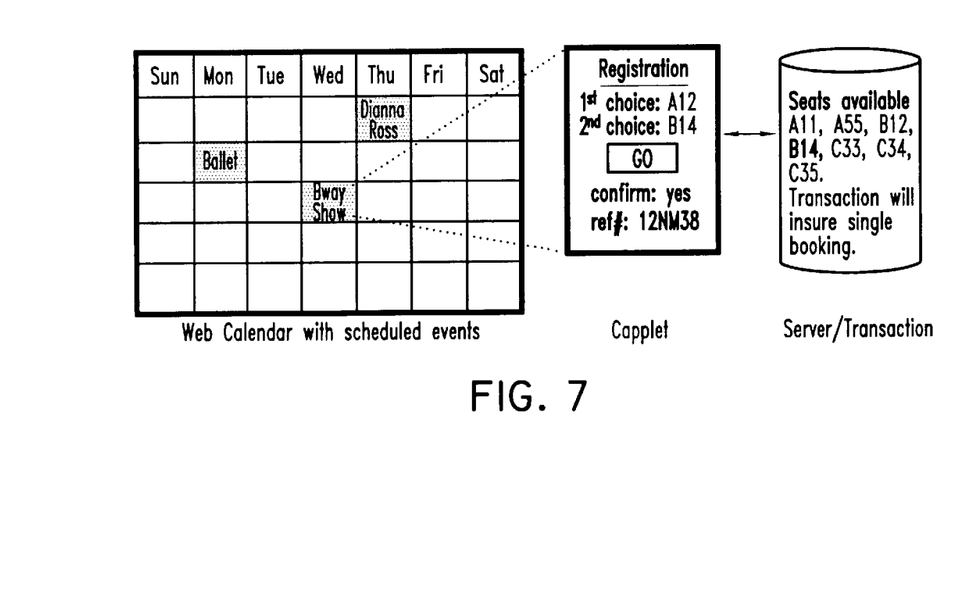
FIG. 7 illustrates an Internet transaction using the Web Calendar according to an embodiment of the present invention.

The process associates a Capplet™ that specializes in Internet transactions with a Web Calendar event, as shown in FIG. 7. It provides users with the capability to make registrations or reservations for a scheduled event directly using the Web Calendar. It enables users to make commitments to calendar events while surfing the Internet. This is a preferred embodiment of the Capplet™, and the architecture is shown in FIG. 1. For example, during a query of Lincoln Center opera calendars, a user can actually activate a Capplet™ that handles the seating arrangement and request tickets for desired shows, and the user can receive either a rejection or a confirmation for the request.

The Capplet™ invoked at the client side loads the pertinent registration form for the desired event, collects user preference information, sends the information to the server, and receives the server response for the user.

The server side processing of the Web Calendar event transaction is responsible for receiving the registration Capplet™ messages, locking up resources (seats, tickets, classes), and making sure there is only one booking per resource. After completing the request, the server sends a return message indicating the status of the request.

API
/**
The RegiServer provides a Registration service whereby clients can request registration forms from a Form database, fill them out and the server will process the form and make a reservation.
*/

```
public class RegiServer implements Runnable {
    protected ServerSocket sock;
    public FormDB rdb;
    public RegiServer( ) {
        try {
            sock=new ServerSocket(port);
        }
        catch (IOException e) {
        System.out.println("Error Creating Socket .. exiting");
            System.exit(1);
        }
        // opens the form database
        rdb=new FormDB("FormTable");
        try {
            rdb.open( );
        catch (Exception e) {
        System.out.println("Unable to open database");
        }
        run( );
    }
/**
    All server actions are performed here. It waits for
    connections parses client requests and issues appropri-
    ate calls to the database
 * @see RegiDB
 * @see ClientComm
 */
    public void run( ) {
    }
/**
 * Clean-Up : close the Form database
 */
    public void finalize( ) {
        rdb.close( );
    }
    // This starts the registration server
    public static void main(String argv[ ]) {
    }
/**
 * This handles the communication on the server side
 */
class ServerComm extends Thread {
public ServerComm(Socket sock, FormDB formDb)
    {this.start( );
}
public void run( ) {
}
/**
 * Registration client Capplet™
 */
public class RegiClient extends Applet™ implements
    ConfigurableCapplet™ {
    public RegiClient( ) {
    public RegiClient(FormID formId) {
    }
/**
    This function is required by the Capplet™ interface
 * @param event This is the event associated with the
        Capplet™
 * @param table: Contains name-value pairs containing
        the parameters
 * for the registration
 */
    public void initCapplet™(CalEvent event,
    Hashtable table) {
    this.eventId=(String)event.getIndexKey( );
    this.eventDesc=
    (String)event.get(EventKey.EVENT_NOTE);
    init( );
    }
    public void init( ) {
    String formName=getParameter("FORMNAME");
    String formOwner=getParameter("FORMOWNER");
    formid=new FormID(formOwner, formName);
    form=RegiConfig.getForm(formId);
```

```
form.setEvent(eventId,eventDesc);
setLayout(new BorderLayout( ));
add("Center", form);
}
public void start( ) {
}
public void stop( ) {
}
/**
 * Returns registration form configuration
   * panel to calendar
 */
public Panel getConfigPanel(Frame frame,
CalEvent ev) {
config=new RegiConfig(user, frame);
return config;
}
/**
 * Returns configuration parameters to
 * calendar
 */
public Hashtable getConfigParameters( ) {
}
class RegiConfig extends Panel {
/**
 * Constructs config panel
 */
RegiConfig(String user, Frame frame) {
   this.frame=frame;
   Panel topPnl=new Panel( );
   previewBtn=new Button("Preview . . .");
   topPnl.setLayout(new
   FlowLayout(FlowLayout.LEFT));
   topPnl.add(new Label("Please select a
   registration form:"));
   topPnl.add(previewBtn);
   constructFormList(user);
   setLayout(new BorderLayout( ));
   add ("North", topPnl);
   add("Center", formList);
}
/**
 * Constructs form name list for selection
 */
void constructFormList(String user) {
   formIds=getFormIDs(user);
   formList=new List( );
   for (int i=0; i<formids.length; i++) {
      if (formIds[i] !=null) {
         System.out.println(formIds[i].getDescription( ));
         formList.addItem(formIds[i].getDescription( ));
      }
   }
}
/*
 * Gets names of all forms available to user
 */
FormID[ ] getFormIDs(String user) {
   ClientComm comm=new
      ClientComm(Session.getHost( ),
   Session.getPort( ));
      return comm.getFormList(user);
}
/**
 * Gets registration form (object) by name
 */
static RegiForm getForm(FormID id) {
ClientComm comm=new
ClientComm(Session.getHost( ),
Session.getPort( ));
   RegiForm form=null;
   return form;
}
/**
 * Handles preview button
 */
   public boolean action(Event evt, Object arg) {
   if (evt.target==previewBtn) preview( );
   return true;
      }
   } // end of class
class RegiPreview extends Dialog {
   RegiPreview(Frame frame, RegiForm form) {
   // modal dialog
   super(frame, "Form Preview", true);
   Panel btnPnl=new Panel( );
   btnPnl.setLayout(new
   FlowLayout(FlowLayout.CENTER));
   btnPnl.add(new Button("OK"));
   add("Center", form);
   add("South", btnPnl);
   pack( );
   }
   public boolean action(Event evt, Object arg) {if
      ("OK".equals(arg)) dispose( );
   return true;
   }
}
/**
 * This handles the communication on the client
 * side
 */
   public class ClientComm {
   // The protocol for the URLConnection
   // NOTE: This will need to be changed to https
      // for secure services
   public static final String protocolDefault="http";
   public ClientComm(String host, int port) {
   }
   public ClientComm(String protocol,String host, int port)
      {
   }
/**
 * Saves the form to the form database. The
 * end of the form contents are delimited by
   * "endForm" on a new line.
 * @param id: The identifier of the form which
 * is to be saved to the
 * database.
 * @param formContents: The content of the
```

```
 * Form as a String
 * @return true if the form is saved
 * successfully, false if the server was
 * unable to save the form or if there was a
 * communication error between server and
    * client
 * @see FormID
 * @see RegiForm
 */
// It will be used by the Form database
// administrator
protected boolean saveForm(FormID id, String
formContents) {
    String key=id.toString( );
    String mesg=
      "COMMAND=PUT&ARG="+URLEncoder.encode
         (key+
     delimiter+formContents+"nendForm");
    try {
      URL target=new
       URL(protocol,host,port,cgi_script+
       "?"+mesg);
      URLConnection conn=
       target.openconnection( );
      conn.setDoInput(true);
      DataInputStream in=new
       DataInputStream(conn.getInputStream( ));
      String line=in.readLine( );
      // find the start of the response
      boolean start=false;
      while (!start) {
      /* DEBUG */ System.out.println(line);
        if (line==null) {
          System.out.println("Broken Connection");
          throw new
      NullPointerException( );
        }
        else
        if (line.equals(startDelimiter)) {
          start=true;
        }
        line in.readLine( );
      }
      // read the response
      while (!line.equals(endDelimiter)) {
        if (line.equalsIgnoreCase("true")) {
          return true;
        }
        else
        if(line.equalsIgnoreCase("false")) {
          return false;
        }
      }
      return false;
    }
    catch (Exception e) {
      return false;
    }
}
/**
 * Gets the id's of all the forms in the form
 * database which are accessible to the user.
 * The expected response from the server all them form
id's separated by
 * delimiters and the response is bounded by
startDelimiter and endDelimiter
 * on separate lines\<p>
 * i.e. startResponsen\<p>
 * id1|id2|id3| . . . n<p>
 * endResponse\n<p>
 * @param The user who is requesting the form list
 * @return The form ids
 */
public FormID[ ] getFormList(String user) {
    int formCount=0;
    String mesg=
      "COMMAND=GETALL&ARG="+
       URLEncoder.encode(user+delimit
     er+"\n")
    try {
      URL target=new
       URL(protocol,host,port,cgi_script+
       "?"+mesg);
      URLConnection conn=
       target.openconnection( );
      conn.setDoInput(true);
      DataInputStream in=new
       DataInputStream(conn.getInputStream( ));
      String line;
      line=in.readLine( );
      // find the start of the response
      boolean start=false;
      while (!start) {
      /* DEBUG */ System.out.println(line);
        if (line==null) {
          System.out.println("Broken Connection");
          throw new NullPointerException( );
        }
        else
        if(line.equals(startDelimiter)) {
          start=true;
        }
        line=in.readLine( );
      }
      StringBuffer content=new
       StringBuffer( );
      // read the response
      while (true) {
      /* DEBUG */ System.out.println(line);
        if (line==null) {
          // this should never occur
          // normally
          System.out.println("Broken Connection");
          throw new NullPointerException( );
        }
        else if(line.equals(endDelimiter)){
          break;
        }
        else {
          content.append(line+"\n");
        }
      /* DEBUG */ System.out.println("CC :"+line);
        line=in.readLine( );
      }
      StringTokenizer st=new
       StringTokenizer(new String(content),
        RegiRequestHandler.delimiter);
      int tokens=st.countTokens( );
      FormID[ ] ret=new FormID[tokens];
```

```
for (int i=0; i<tokens; i++) {
    String next=st.nextToken( );
    System.out.println("CC:
        next="+next);
    FormID id=new FormID(next);
    if(id.getowner( )==null ||
id.getowner( ).equals("null") ||
    id.getowner( ).equals(user))
    }
        ret[formCount]=id;
            formCount++;
    }
    }
    return ret;
}
catch (Exception e) {
    e.printStackTrace( );
    return null;
}
}
/**
* This instructs the RegiServer to process a form
* with some name-value pairs<p>
* The expected response is multiline bounded by
"startRequest" and
* "endRequest" on separate lines.<p>
* @param id : The form which is to be processed
* @param eventID: The event which caused the
registration
* @param attr : A string which contains the name-value
    pairs for
filling the form.
*return The result of processing the form
*/
public String request(FormID id, String eventID, String
    attr){
    System.out.println("CC: REQ "+id+" "+eventID+"
        "+attr);
    String form_id=id.toString( );
    String mesg=
"COMMAND=REQ&ARG=" +URLEncoder.encode
    (form_id+delimiter+eventID
+delimiter+attr+delimiter+"\n");
    try {
        URL target=new
URL(protocol,host,port,cgi_script+"?"+mesg);
        URLConnection conn=target.openConnection( );
        conn.setDoInput(true);
        DataInputStream in=new
DataInputStream(conn.getInputStream( ));
        /* Get the single line response from
        * the server
        String buffer=in.readLine( );
        return buffer;
        */
        // Get a multi-line response from the server
        // bounded by "startResponse" and "endResponse"
on
        // separate lines
        StringBuffer content=new StringBuffer( );
        String line=in.readLine( );
        boolean start=false;
        while (!start) {
            if (line==null) {
                System.out.println("Broken Connection");
                throw new NullPointerException( );
            }
            else if
            (line.equals(startDelimiter)) {start=true;
            }
            line=in.readLine( );
            System.out.println("CC: "+line);
        }
        while (true) {
            if (line==null) {
                System.out.println("Broken Connection");
                throw new NullPointerException( );
            }
            else
            if (line.equals(endDelimiter)) {break;
            }
            else {
                content.append(line+"\n");
                }
                line=in.readLine( );
                    System.out.println("CC: "+line);
            }
            System.out.println("CC :"+new String(content));
            return new String(content);
        }
        catch (Exception e) {return null;
        }
    }
}
```

What is claimed is:

1. An interactive Web-based calendar comprising:

a plurality of calendars view; and a calendar base for displaying a plurality of calendar events, which are residing on a plurality of network servers, in the plurality of calendar views, wherein a Web-based program is associated with at least one of the plurality of calendar events, and a plurality of Web-based programs may run simultaneously within the Web-based calendar.

2. An interactive Web-based calendar according to claim 1, wherein the Web-based program runs when activated by the user to access information related to a calendar event associated with the Web-based program.

3. An interactive Web-based calendar according to claim 1, wherein the Web-based program runs when at least one of the following occurs:

a calendar event associated with the Web-based program occurs, a user activates the Web-based program, a view in which the calendar event associated with the Web-based program is enabled, and/or another one of the plurality of Web-based programs activates the Web-based program.

4. An interactive Web-based calendar according to claim 1, wherein the Web-based program provides multimedia effects.

5. A method of performing an Internet scheduling transaction using a Web-based calendar, comprising the steps of:

(a) accessing a Web site of a Web-based calendar;

(b) selecting a scheduled event from the calendar;

(c) receiving an event registration form via the Internet from a server associated with the scheduled event;

(d) registering for the scheduled event by providing registration information to the server via the event registration form; and (e) receiving a response from the server.

6. A method of performing scheduling transactions according to claim 5, wherein step (e) comprises receiving one of a message indicating that the registration is denied and a message confirming the registration.

7. A method of performing scheduling transactions according to claim 5, wherein the scheduled event is one of a theater show, a musical performance, a sports game, a college course, a concert, a convention, and a meeting.

8. A method of performing scheduling transactions according to claim 5, wherein step (c) includes receiving seating information from the server.

9. A method of using a Web-based calendar, comprising the steps of:

accessing an Internet Web site of a Web-based calendar, the calendar being a program in a Web-based programming language;

activating a Web-based application program by selecting a scheduled event from the calendar, the Web-based application program being associated with the scheduled event; and receiving a response based on the activated Web-based application program.

10. A method of using a Web-based calendar according to claim 9, wherein the response is a multimedia response.

11. A method of using a Web-based calendar according to claim 9, further comprising the steps of:

receiving an event registration form via the Internet from a server associated with the scheduled event.

12. A method of using a Web-based calendar according to claim 9, wherein the response is an event application for the scheduled event.

13. A method of using a Web-based calendar according to claim 9, wherein the scheduled event is one of a theater show, a musical performance, a sports game, an educational course, a concert, a convention, and a meeting.

* * * * *

UNITED STATES PATENT AND TRADEMARK OFFICE
CERTIFICATE OF CORRECTION

PATENT NO. : 6,278,456 B1
DATED : August 21, 2001
INVENTOR(S) : Shou-Chung Wang, Wenwey Hseush and Anthony MA It is certified that error appears in the above-identified patent and that said Letters Patent is hereby corrected as shown below:

Column 18,
Line 37, "calendars view" should read -- calendar views --.

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.        : 6,278,456 B1
APPLICATION NO.   : 09/416086
DATED             : August 21, 2001
INVENTOR(S)       : Wang et al.

Page 1 of 1

It is certified that error appears in the above-identified patent and that said Letters Patent is hereby corrected as shown below:

On the Title page, item (56), under "U.S. Patent Documents", in column 1, line 4, delete "Mesice" and insert -- Meske, Jr. et al. --, therefor.

Signed and Sealed this

First Day of September, 2009

David J. Kappos
*Director of the United States Patent and Trademark Office*